United States Patent
Wang et al.

(10) Patent No.: US 11,646,059 B2
(45) Date of Patent: May 9, 2023

(54) ESTIMATING READ OFFSET IN A DRIVE USING MACHINE LEARNING

(71) Applicant: Seagate Technology LLC, Fremont, CA (US)

(72) Inventors: Zheng Wang, Louisville, CO (US); Ara Patapoutian, Hopkinton, MA (US); Jason Bellorado, San Jose, CA (US); William M. Radich, Berthoud, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/460,735

(22) Filed: Aug. 30, 2021

(65) Prior Publication Data

US 2023/0067909 A1 Mar. 2, 2023

(51) Int. Cl.
*G11B 21/10* (2006.01)
*G06N 3/04* (2023.01)

(52) U.S. Cl.
CPC .......... *G11B 21/106* (2013.01); *G06N 3/04* (2013.01)

(58) Field of Classification Search
None
See application file for complete search history.

(56) References Cited

U.S. PATENT DOCUMENTS

| | | | | |
|---|---|---|---|---|
| 5,459,679 | A * | 10/1995 | Ziperovich | G11B 20/10009 708/3 |
| 5,699,487 | A * | 12/1997 | Richardson | G11B 5/09 |
| 5,808,988 | A * | 9/1998 | Maeda | G11B 7/00745 |
| 5,970,032 | A * | 10/1999 | Ikeda | G11B 7/094 369/53.28 |
| 6,141,175 | A * | 10/2000 | Nazarian | G11B 5/59688 360/77.04 |
| 6,339,567 | B1 * | 1/2002 | Shimamoto | G11B 7/094 369/44.29 |
| 2001/0013986 | A1* | 8/2001 | Makiura | G11B 20/1816 |
| 2009/0052294 | A1* | 2/2009 | Honma | G11B 20/10055 369/59.19 |
| 2017/0263275 | A1* | 9/2017 | Tagami | G11B 20/1217 |
| 2019/0385094 | A1 | 12/2019 | Alex et al. | |

* cited by examiner

*Primary Examiner* — Peter Vincent Agustin
(74) *Attorney, Agent, or Firm* — Mueting Raasch Group

(57) ABSTRACT

Components are extracted from user data being read from a reader of a hard disk drive. The components collectively indicate both a magnitude and direction of a read offset of the reader over a track. The components are input to a machine-learning processor during operation of the hard disk drive, causing the machine-learning processor to produce an output. A read offset of the reader is estimated during the operation of the hard drive head based on the output of the machine learning processor. While reading the user data, a radial position of the reader over the track is adjusted via an actuator based on the estimated read offset.

19 Claims, 8 Drawing Sheets

ESTIMATING READ OFFSET IN A DRIVE USING MACHINE LEARNING

SUMMARY

The present disclosure is directed to estimating read offset in a drive using machine learning. In one embodiment, a method involves extracting components extracted from user data being read from a reader of a hard disk drive. The components collectively indicate both a magnitude and direction of a read offset of the reader over a track. The components are input to a machine-learning processor during operation of the hard disk drive, causing the machine-learning processor to produce an output. A read offset of the reader is estimated during the operation of the hard drive head based on the output of the machine learning processor. While reading the user data, a radial position of the reader over the track is adjusted via an actuator based on the estimated read offset.

In another embodiment, a method involves determining Volterra coefficients from data being read from a reader of a hard disk drive. The Volterra coefficients are input to a machine-learning processor during operation of the hard disk drive, causing the machine-learning processor to produce an output. A read offset of the reader is estimated during the operation of the hard drive head based on the output of the machine learning processor.

In another embodiment, a method involves training a machine learning model using a plurality of test drives. The machine learning model predicts a read offset of the plurality of test drives based on components extracted from user data being read from readers of the plurality of test drives. The components collectively indicate of both a magnitude and direction of read offsets of each reader over a track. The machine learning model is transferred to a machine learning processor of a fieldable drive. The machine learning model is additionally trained within the fieldable drive based on the components extracted from other user data in the fieldable drive.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to data storage devices such as hard disk drives (HDDs). These drives stored data by applying a changing magnetic field from a recording head to the surface of a magnetic disk that is moving relative to the head. A recording head generally includes a read transducer, e.g., magnetoresistive (MR) sensors that can read back the recorded data by translating the changing magnetic fields to analog electrical signals. The analog electrical signals are processed and conditioned, converted to digital data, and decoded to recover the stored data, which can then be sent to a requestor, e.g., a host computer, an internal controller, etc.

In order to read the data from the disk, the head needs to closely follow the written tracks. The disk will typically include pre-recorded servo marks over the entire surface that allow the reader to determine its location (e.g., track and sector) as well as how well the head is aligned over the center of the track. These servo marks are used during both read and write operations. A servo controller will read the marks and apply signals to an actuator (e.g., voice coil motor, or VCM and microactuator) that moves the head radially across the disk surface. The servo marks are written during the manufacture of the drive and are not intentionally written over thereafter. Other data written in sectors between the servo marks is referred to herein as "user data," as it is typically data that is stored by a user of the drive (e.g., a host computer), although the drive may record some data in this space for its own use. Generally, user data is expected to be written and rewritten many times during the life of the drive.

While servo marks can provide a precise measurement of radial location while they are being read during a track following operation, the read head typically spends more time reading user data from the recorded sectors because the servo marks take up a relatively small portion of the tracks. Thus, it is desirable to incorporate features to estimate read offset from the user data itself in addition to servo marks. Given that areal density is increasing with each generation of hard disk drives (and with newer technologies such as heat-assisted magnetic recording, or HAMR), the tracks are also becoming narrower. This can have an impact on read operations due to mistracking, as it can lead to increases in failure to read back recorded data, resulting in time consuming re-reads or other remedial operations.

Figure 1:
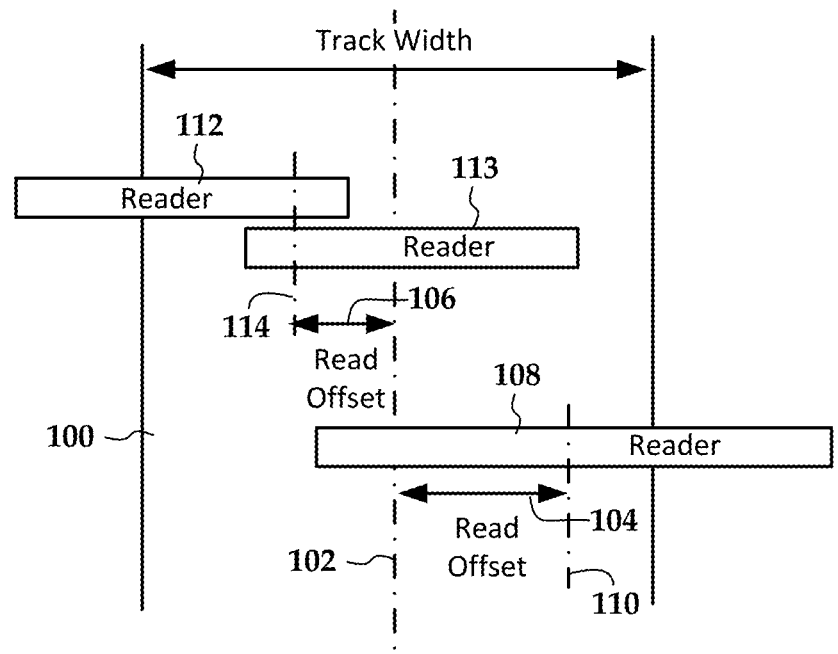
FIG. 1 is a block diagram showing track and head arrangements of various embodiments.

In a hard disk drive, read offset is, most generally, defined as the radial deviation of the read head(s) from the position deemed most beneficial to the recovery operation of a sector. In FIG. 1, a diagram shows concepts related to read offset. A track 100 has a track reference line 102, which is typically the track center. Read offsets 104, 106 are measured relative to this track reference line 102. Read offset 104 is between a reader reference line 110 (e.g., centerline) of a single reader 108 and the track reference line 102. Read offset 106 is between a reader reference line 114 of multiple readers 112, 113, which are located on a single head. The multiple reader reference line 114 could be a center of the total width of both readers 112, 112, or some other location depending on the symmetry of the heads and the signal processing of the read signals. Note that both read offsets 104, 106 are assumed to have both a magnitude and direction, e.g., left or right of the track reference line 102.

In some embodiments a read offset of 0 (also referred to as the track center 102 as shown in FIG. 1) minimizes the resulting bit error-rate, whereas in other embodiments a read offset of 0 allows for the optimal combining of signals from multiple, different readers that are co-located on the same head. In all cases placing the read head(s) at the track center plays a role in maximizing readback signal quality and ensuring optimal channel performance.

In order to ensure that the reader stays over the recorded tracks while reading user data, schemes have been developed that enable determining a read offset based on characteristics of the user data signals. This read offset estimation can provide servo inputs that adjust read position while reading the user data and potentially increase the quality of the read signal. These rules-based schemes can extract components from the data stream, such as by determining Volterra coefficients of the data stream. However, these rules-based systems are susceptible to significant errors, such as where tracks have been squeezed due to adjacent track overwrite and/or where signal quality of the read signal is poor.

In embodiments described below, a machine learning (ML) apparatus, such as a neural network, is proposed to robustly estimate read offset in the presence of track squeeze and other nuisance parameters. The machine learning process can more effectively utilize a multitude of relevant parameters that may not be amenable to algorithmic or rule-based techniques. Such a technique can be used in both single reader and multiple reader heads. This can be used for track following servo controller, and may provide information usable for other processes, such as data detection and decoding.

Figure 2:
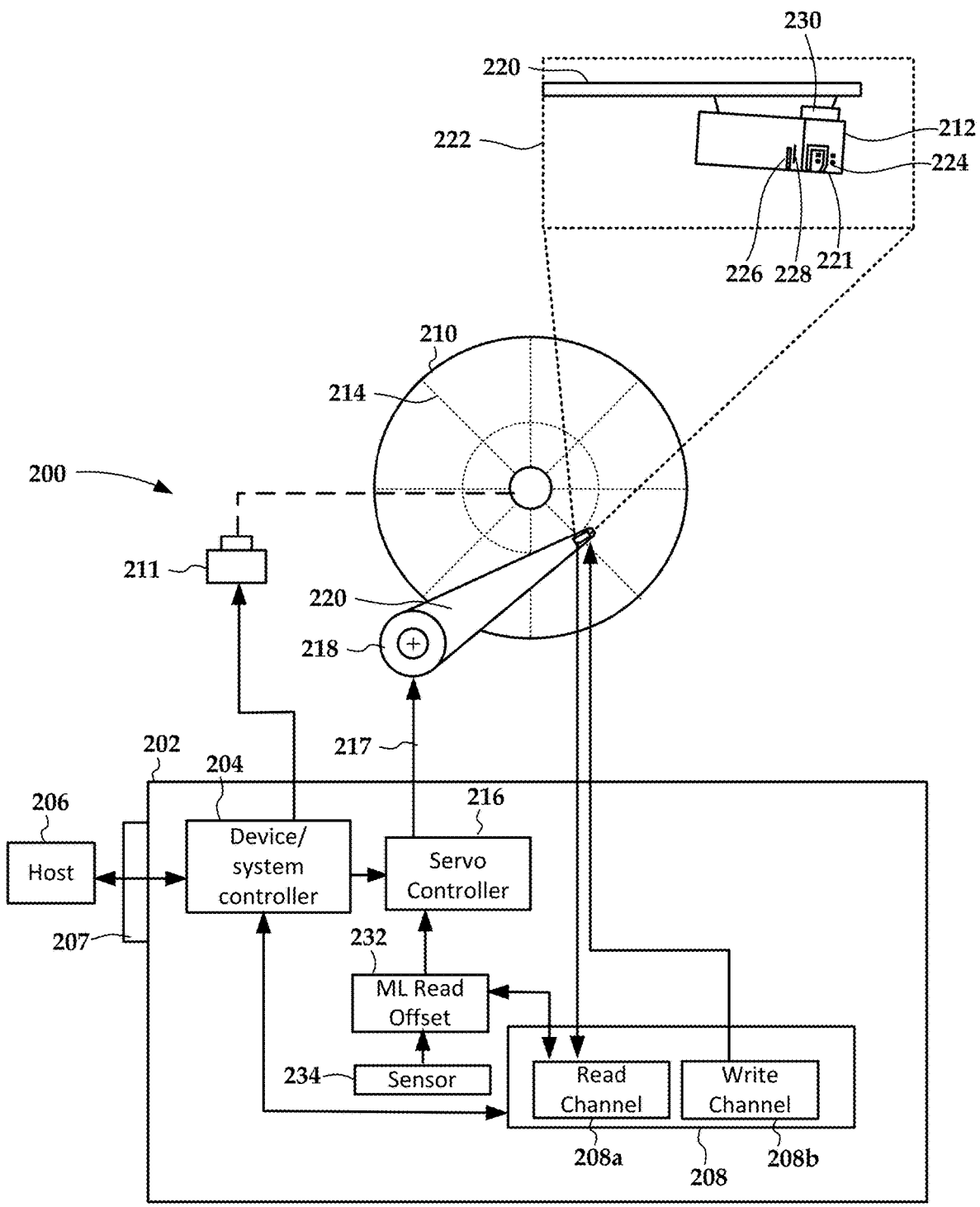
FIG. 2 is a block diagram of a data storage device according to an example embodiment.

In order to understand the context in which an ML-enabled servo system may operate, FIG. 2 illustrates a block diagram a data storage apparatus 200 (e.g., HDD) according to an example embodiment. The apparatus 200 includes circuitry 202 such as one or more device/system controllers 204 that process read and write commands and associated data from a host device 206 via a host interface 207. The host interface 207 includes circuitry that enables electronic communications via standard bus protocols (e.g., SATA, SAS, PCI, NVMe, etc.). The host device 206 may include any electronic device that can be communicatively coupled to store and retrieve data from a data storage device, e.g., a computer, a server, a storage controller. The system controller 204 is coupled to one or more read/write channels 208 (shown here as separate read channel 208a and write channel 208b) that read from and write to a recording media, which in this figure are surfaces of one or more magnetic disks 210 that are rotated by a spindle motor 211.

The read/write channels 208 generally convert data between the digital signals processed by the device controller 204 and the analog signals conducted through one or more heads 212 during read and write operations. As seen in detail view 222, each head 212 may include one or more read transducers 226 each capable of reading one surface of the disk 210. The head 212 may also include respective write transducers 224 that concurrently write to the disk 210. The write transducers 224 may be configured to write using an energy source (e.g., laser 230 for a HAMR device), and may write in various track configurations, such as conventional tracks, shingled magnetic recording (SMR), and interlaced magnetic recording (IMR).

The read head 212 is also shown with a clearance actuator, here shown as a heater 228 located proximate an ABS 221 of the head 212. The heater 228 may include a resistance and/or inductive heater, and more than one heater 228 may be used. Also note that in addition to the heater 228, the write transducer 224 and laser 230 (if used) can also contribute to heating of the head 212, resulting in write protrusion that can decrease fly height in addition to the protrusion induced by the heater 228.

The read/write channels 208 may include analog and digital circuitry such as digital-to-analog converters (DACs), analog-to-digital converters (ADCs), detectors, decoders, timing-recovery units, error correction units, etc. The read/write channels 208 are coupled to the heads 212 via interface circuitry that may include preamplifiers, filters, etc. A separate read channel 208a and write channel 208b are shown, although both may share some common hardware, e.g., digital signal processing chip.

In addition to processing user data, the read channel 208a reads servo data from servo marks 214 on the magnetic disk 210 via the read/write heads 212. The servo data are sent to one or more servo controllers 216 that use the data (e.g., frequency burst patterns and track/sector identifiers embedded in servo marks) to provide position control signals 217 to one or more actuators, as represented by voice coil motors (VCMs) 218. In response to the control signals 217, the VCM 218 rotates an arm 220 upon which the read/write heads 212 are mounted. The position control signals 217 may also be sent to microactuators (not shown) that are mounted close to each head-gimbal assembly and individually control each of the heads 212, e.g., causing small displacements at each read/write head 212.

The signals processed via the read channel 208a can also be used by a machine-learning read offset estimator 232. The machine-learning read offset estimator 232 takes different inputs from the read channel 208a which can collectively provide both an amplitude and direction of read offset. Generally, these inputs are characteristics of user data currently being processed by the read channel 208a, e.g., via an ADC, detector, decoder, etc. Other inputs may be used that are not necessarily provided by the read channel 208a. For example, different heads 212 have different characteristics, e.g., due to manufacturing tolerances, and so the specific head characteristics can be incorporated into the read offset estimation. This can be accomplished using a different label for each head, e.g., 0, 1, 2, etc. Also, the apparatus 200 may have a sensor 234 such as a vibration sensor (e.g., an accelerometer) that can detect disturbances that potentially affect tracking. The sensor outputs can be used to detect/predict read offsets.

As noted above, rule-based algorithms are known that can be used to estimate read offset. For example, U.S. Pat. No. 7,885,025 (Generating PES Using Readback Signal Distortion), describes a correlation between the sum of second order Volterra coefficients of a readback signal from a reader element and its read offset value. Generally, the Volterra coefficients are part of an expansion of a dynamic, nonlinear, time-invariant functional referred to as a Volterra series. The Volterra series includes a summation of functions known as Volterra kernels, which can each be considered as a $n^{th}$-order impulse response of the system.

Figure 3:
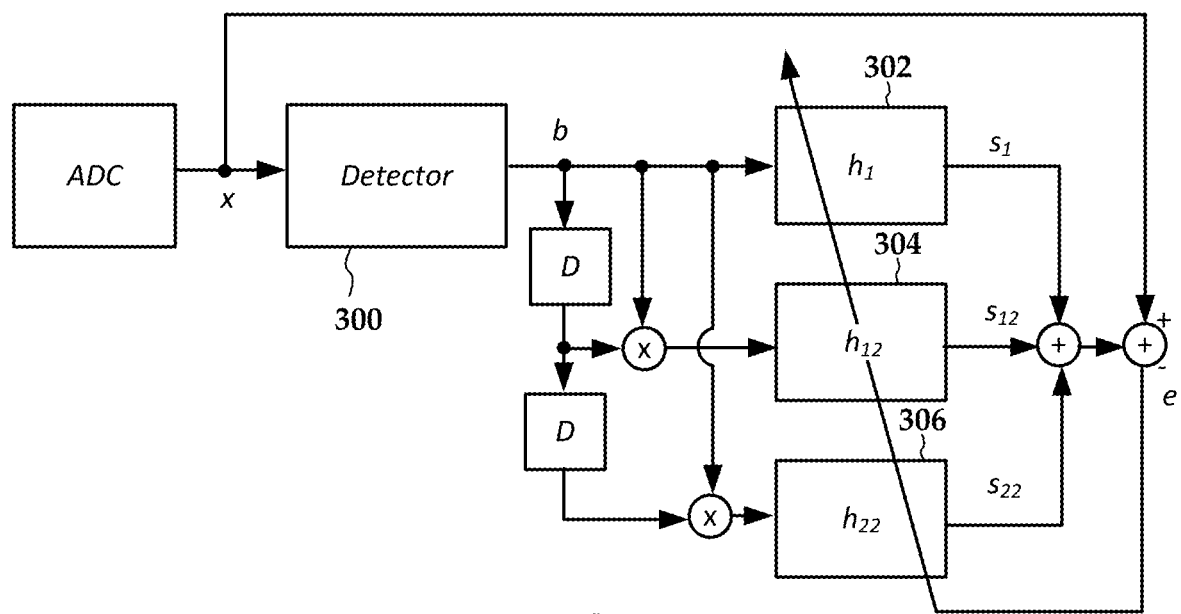
FIG. 3 is a block diagram showing use of Volterra coefficients for estimating read offset according to an example embodiment.

In FIG. 3, a diagram shows how the Volterra coefficients of a finite Volterra series can be utilized for read offset estimation according to an example embodiment. In this example, the 1st and 2nd order Volterra kernel coefficients can be extracted from the ADC samples of a readback signal using a detector 300. For a system with a memory of length of K, the coefficients of the 1st order kernel (302) $h_1$ can be represented by $s_1^1, s_2^1, s_3^1, \ldots, s_K^1$, and the coefficients of the 2nd order kernels (304, 306) $h_{12}$ and $h_{22}$ can be represented by $s_1^{12}, s_2^{12}, s_3^{12}, \ldots, s_K^{12}$ and $s_1^{22}, s_2^{22}, s_3^{22}, \ldots, s_K^{22}$, respectively. As discussed in U.S. Pat. No. 7,885,025, the amplitude of the position error signal (PES) generated from these kernel coefficients carries read offset information. More specifically, the sum of the 2nd order coefficients $\beta$ defined as follows in Equation (1) below is proportional to the read offset value. This approach is referred to as DEEP, or dibit extraction for estimating position.

$$\beta = \Sigma_{i=1}^{K}(s_i^{12} + s_i^{22}), \tag{1}$$

Figure 4:
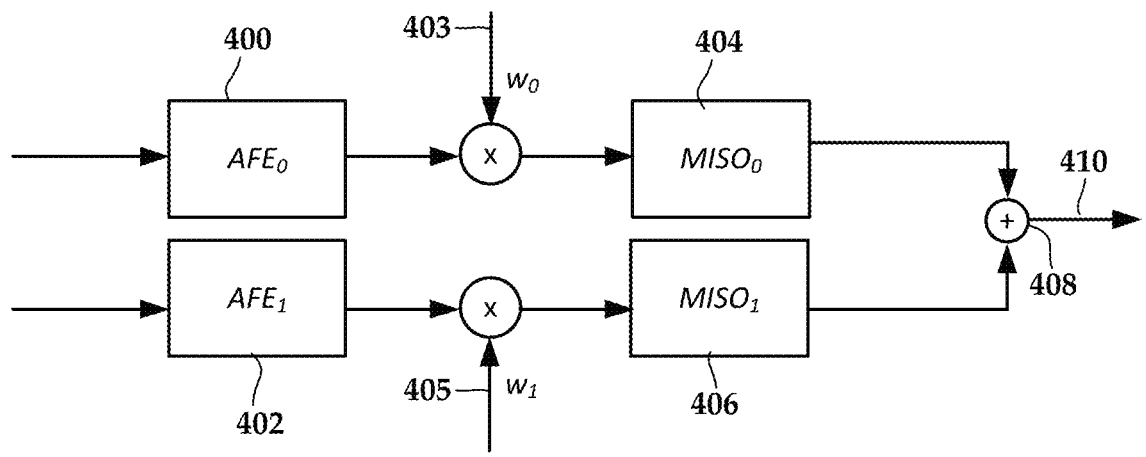
FIG. 4 is a block diagram showing components of a multiple reader head that can be extracted for estimating read offset according to an example embodiment.

In addition to $\beta$, a dual-reader system could use additional information for read offset estimation, as shown in the block diagram of FIG. 4. In dual-reader system, two paths of signals from two readers are received at analog front ends 400, 402. Each path of signal is assigned a weight 403, 405, denoted by $w_0$ for reader 0 and $w_1$ for reader 1, respectively. The individual weights determine the contribution of each reader's signal to the output, which is processed by multiple input, single-output (MISO) filters 404, 406. The output of the MISO filters 404, 406 are combined at block 408. The final, combined signal 410 can have an improved signal-to-noise ratio (SNR) relative to a single reader reading the same data track.

The weights 403, 405 may be adapted based on a least squares criterion jointly with a target to which the combined signal is attempting to match. As a result, the adapted values of these weights 403, 405 may be used to indicate the magnitude of each reader's deviation from the track center. Because the readers are at a known orientation to the track (e.g., left side, right side) these weights also provide information about which direction the deviation is occurring.

Two issues have motivated the improvement upon the previous rule-based algorithms. First, the previously proposed algorithms (e.g., DEEP or MISO weighting) can sometimes have difficulties in identifying and handling nuisance parameters, such as squeeze. If a track is squeezed from either or both sides by adjacent tracks(s), the dynamic between p for example, and the read offset value would change according to the squeeze value and pattern (e.g., whether the squeeze is from single or double sides, and in the second case, whether the squeeze is symmetric). The squeeze value is, however, unknown. Therefore, the squeezed value may not be reliably used as an input of the algorithm to adjust the estimation rules. It is not clear if there are efficient or effective rule-based algorithms that can predict read offset in the presence of an unknown squeeze.

Figure 5:
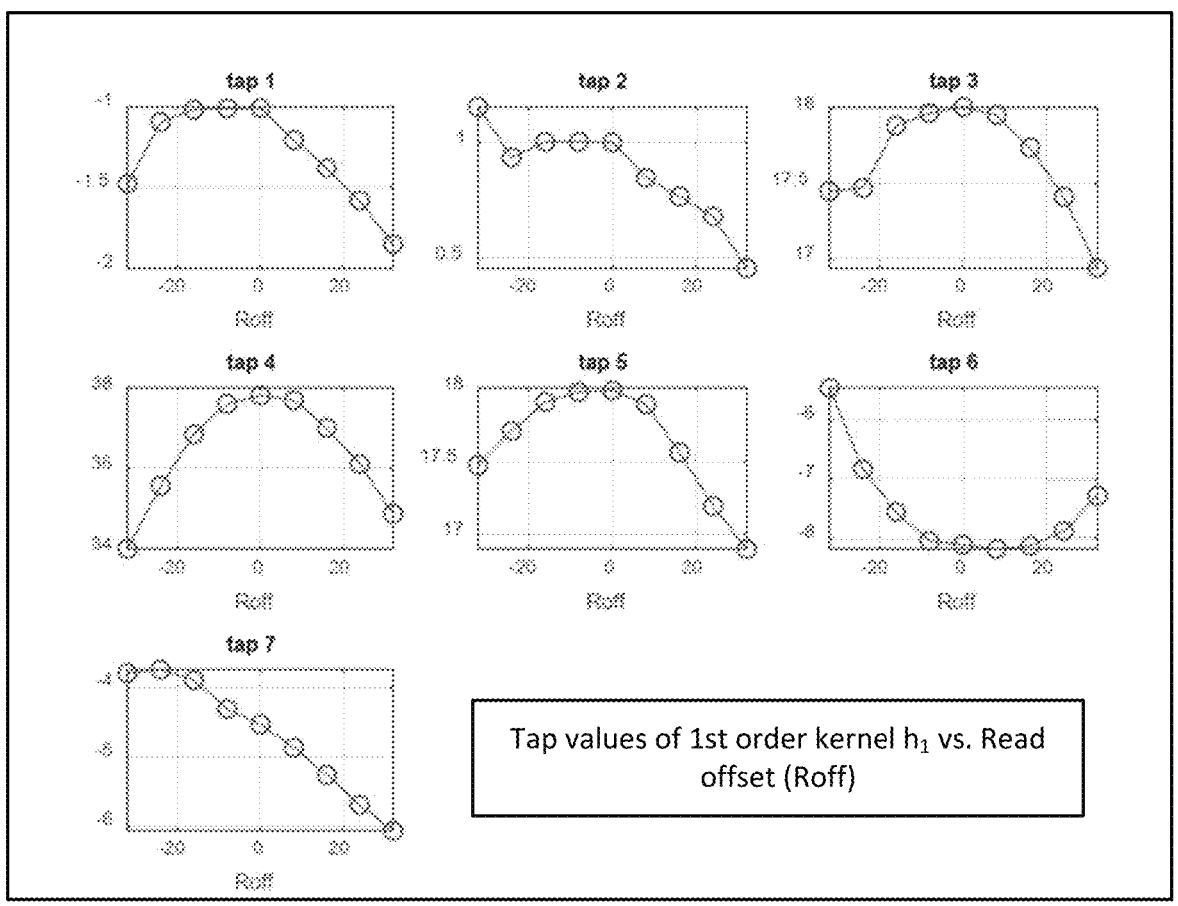
FIGS. 5-7 are graphs showing read offset curves associated with first and second order Volterra kernels that can be extracted for estimating read offset according to an example embodiment.
Figure 6:
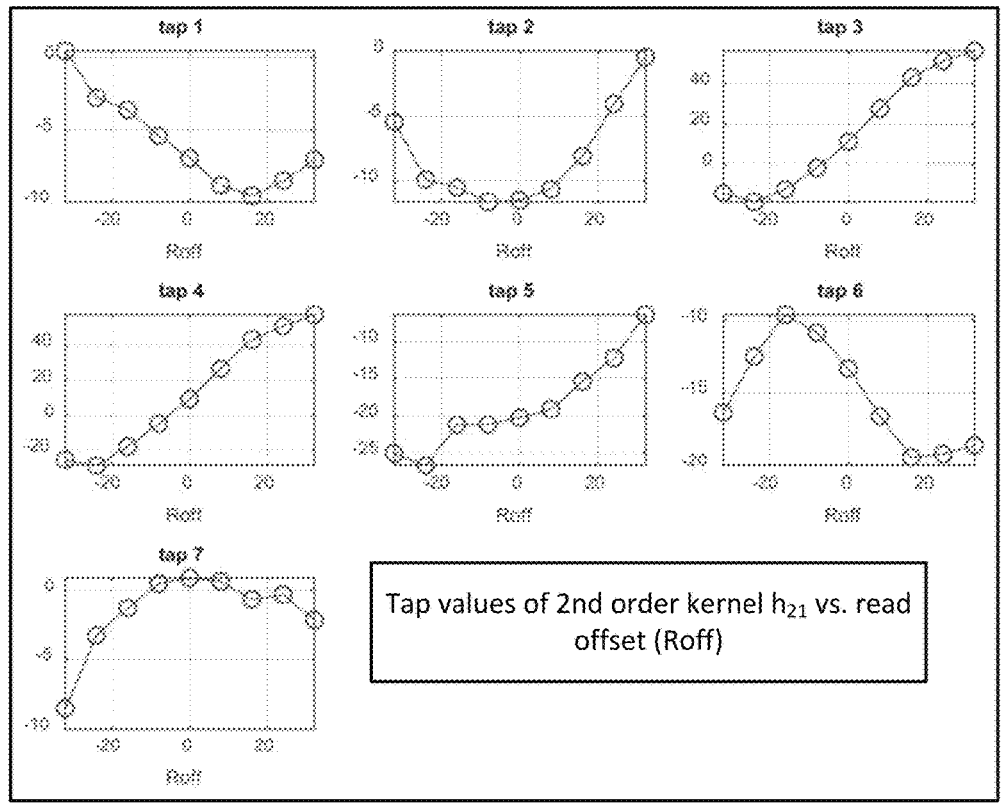
Figure 7:
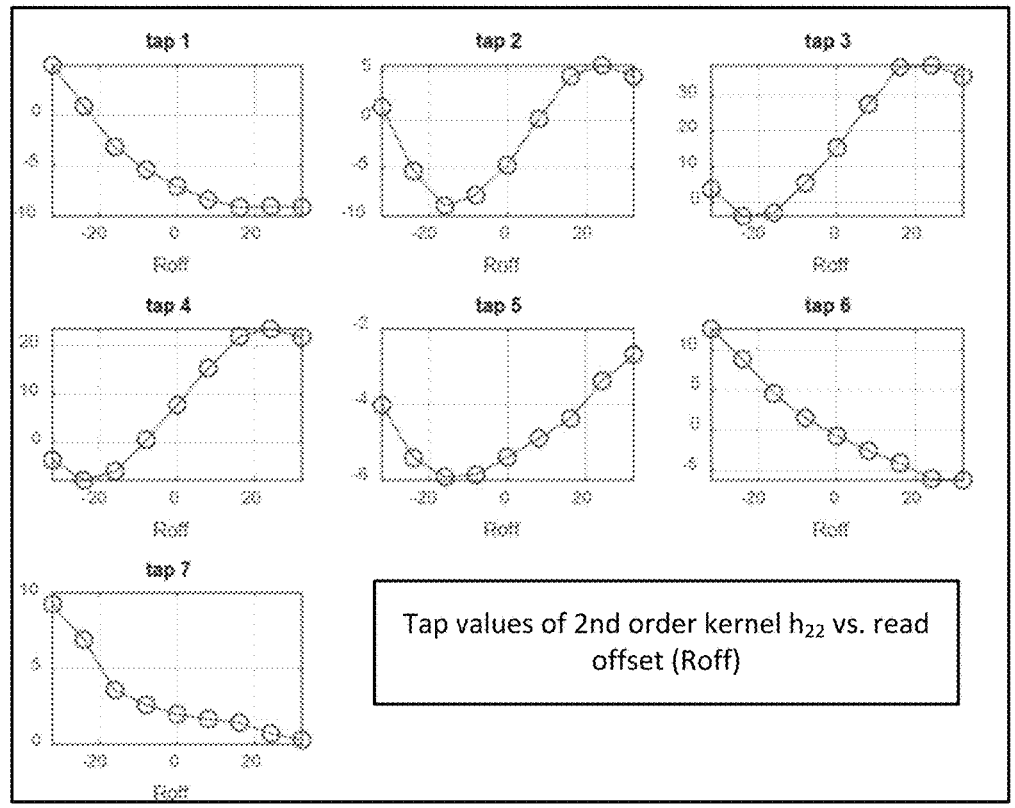

A second issue with rule-based algorithms is that these algorithms capture known first-order effects. For example, the scaler $\beta$ defined in Equation (1) has a linear relation to reader-offset. Hence it can be easily adopted by rule-based algorithm to estimate read offset. However, as shown in the graphs of FIGS. 5-7, each individual tap (with the center tap, e.g., tap 4, as the main tap) from the 1st and 2nd order kernels carries its own read offset information. By adding all the 14 filter taps together as in Equation (1), some information carried by the individual taps could be lost.

Figure 8:
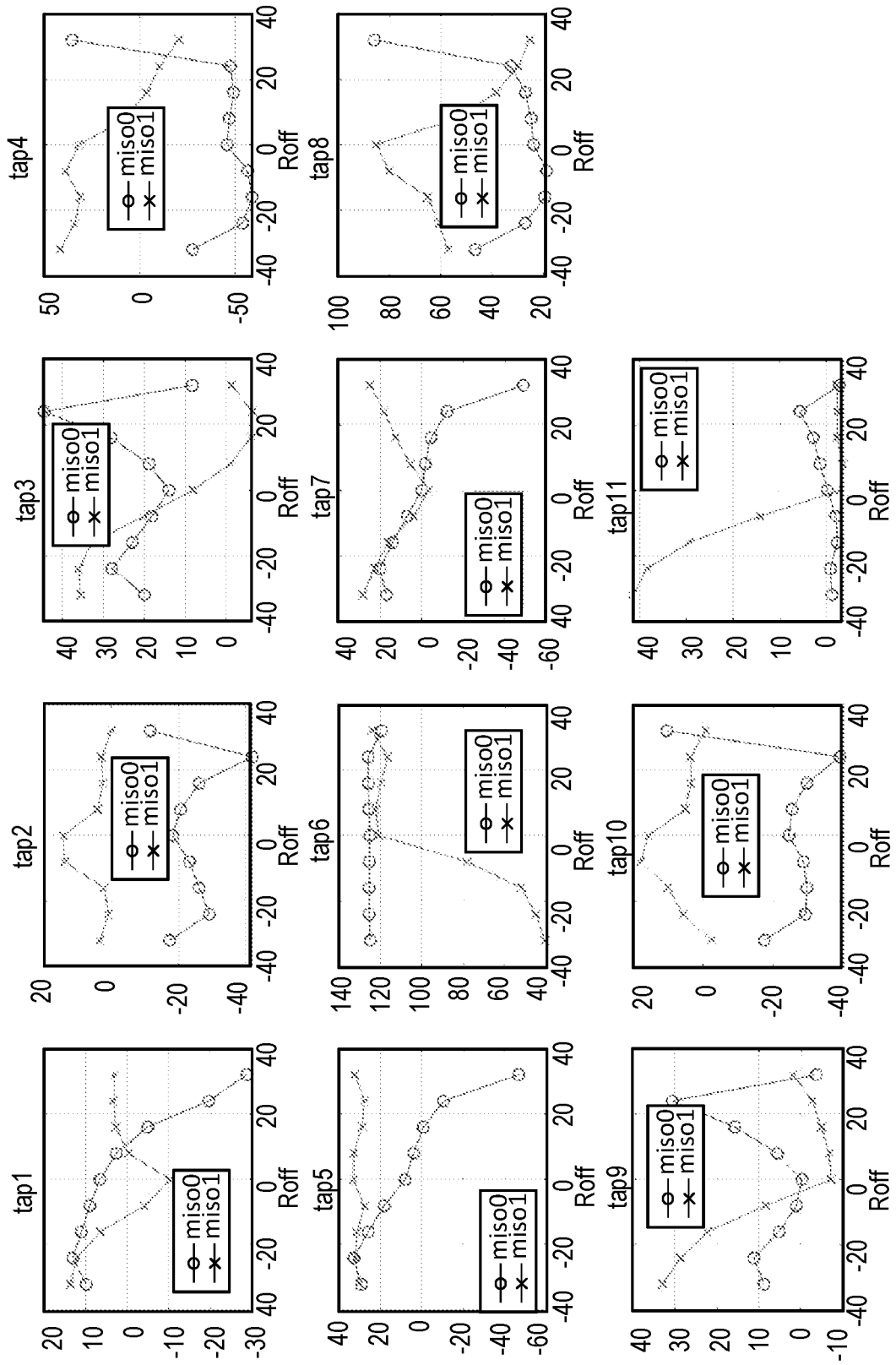
FIG. 8 is a set of graphs showing read offset curves associated with multiple input, single output filter taps that can be used for estimating read offset according to an example embodiment.

In addition to DEEP parameters, and head weights (for dual-reader systems), read offset information is also carried in other variables/metrics. For example, a metric that measures the quality of the readback signal is useful in estimating the reader-offset. This metric can be derived by examining the log likelihood ratios (LLR) at detector output. The metric can be calculated by counting the number of LLR values that are lower than a fixed threshold (referred to as low LLR count), or by summing over all the LLR values within that codeword (which is referred to as soft LLR sum), etc. These metrics have been shown to have good correlation with the bit-error rate of the detector For dual-reader system, besides the two reader scalers of $w_0$ and $w_1$ shown in FIG. 4, the MISO filters 404, 406 following afterwards also carry read offset information. Each MISO filter 404, 406 has multiple taps (e.g., 11 taps). In FIG. 8, a set of graphs shows how each MISO tap changes with respect to read offset values, with the center tap (tap 6 in this case), as the main tap.

The radial location of the track also impacts the read offset, such as track number or zone number. These values can be represented as track and/or zone identifiers/numbers. The track number is related to head skew, and the zone number can provide linear density information, which can change from zone-to-zone. Both skew and linear density can have subtle effects on information extracted from the read signals used to estimate read offset. Since different heads have different characteristics, due to manufacturing tolerances, it is advantageous to include the specific head characteristics into the read offset estimation.

Machine learning approach has its unique strength in handling the issues noted above that could complicate an algorithmic approach. The nuisance parameters usually leave their signatures in metrics/parameters, although they may be hard to identify. Machine learning algorithms, if properly designed, could automatically identify these hidden signatures and thus take them into account for final estimation, even when the nuisance parameter is not presented at the input. Machine learning can incorporate a multitude of the above parameters/metrics for more accurate estimation of read offset values. It eliminates the need to specify explicit rules, which can be very challenging if the number of inputs is large.

It will be understood that, besides DEEP coefficients, MISO filter coefficients, etc. described above, other components could be extracted from the user data signal that are indicative of either a direction or magnitude of reader offset, or both. For example, if domain transformed data (e.g., spectral data) is known to have asymmetric characteristics on either side of the track, then components of this transformed data (e.g., amplitudes in the transform domain) can be used as input to a machine learning processor as described.

Figure 9:
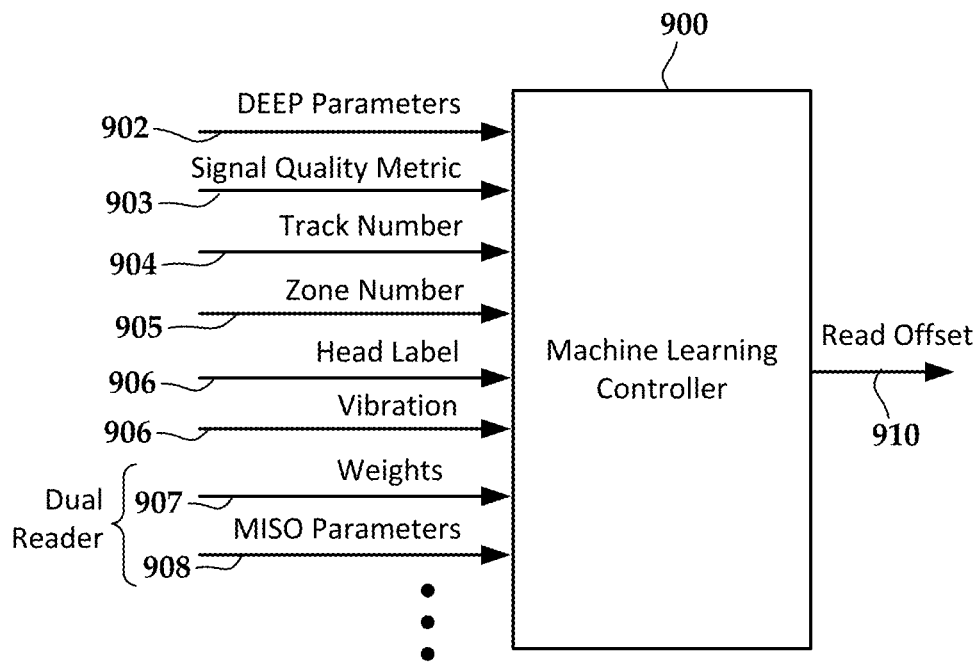
FIG. 9 is a block diagram of a machine learning controller that estimates read offset according to an example embodiment.

In FIG. 9. a block diagram shows an example embodiment of read offset estimation using a machine learning controller apparatus 900. For a single-reader system, inputs, such as DEEP parameters 902 (e.g., individual taps, preprocessed tap values, combined tap values, etc.), signal quality metrics 903 (e.g., low LLR count, soft LLR sum, mean square error, soft bit error rate, etc.), radial position (such as track number 904, zone number 905), head label 906, vibration measurement 909, etc., can be passed through the apparatus which generates the estimation 910 of read offset. For dual reader system, additional inputs, such as weights 907 and MISO filter parameters 908 (e.g., individual taps, preprocessed tap values, combined tap values, etc.) can also be used. These input values 902-909 can be processed jointly in any combination by the machine learning controller apparatus.

Figure 10:
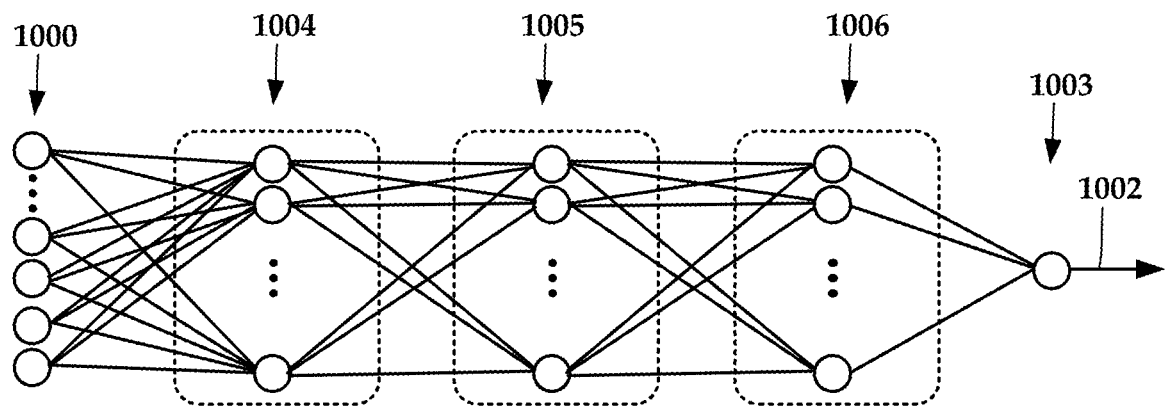
FIG. 10 is a diagram showing a neural network that estimates read offset according to an example embodiment.

One option for machine learning controller apparatus 900 is a neural network. The block diagram in FIG. 10 shows a read offset estimation neural network according to an example embodiment. It is a fully connected feedforward neural network, with N inputs 1000 and one output 1002 from output layer 1003. The network in this example includes three hidden layers 1004-1006, with ten nodes in each layer. Mean square error can be used as cost function. For the hidden layers 1004-1006, rectified linear unit (ReLU) can be used as activation functions, and for output layer 1003, a linear activation function can be applied. The Adam optimizer (which is an extension to stochastic gradient descent) can be used with L2 regularization.

Note that other arrangements of a neural network may be used for read offset estimation. For example, instead of one output, a network could provide multiple outputs that provide probabilities that the read offset RO is to the left or the right (or some other indication of direction, such as towards inner diameter or towards outer diameter) as well as another output indicating the magnitude of the offset. Such a configuration could use different activation functions and cost functions. In another example, additional output can be added to estimate, e.g., squeeze values, on top of read offset. Also note that a network may use different numbers of nodes and hidden layers than shown in FIG. 10, and may utilize other structures, e.g., a recurrent network.

The training process for neural network involves preparing training data. The data is collected over different heads at various radial locations and using different types of data and intentional offsets. In some embodiments, the data may be collected by reading specially constructed test tracks that can be analyzed to estimate actual read offset. This data collection could be performed by reading test tracks at intentional offsets to characterize the input parameters at each of the offsets. The data collection could also use differently squeezed tracks in order to train the network to detect and characterize track squeeze. The input of the neural network can be chosen from the previously listed metrics/parameters, e.g., in FIG. 9, and the target of the neural network is labeled with the read offset values. Hyperparameter tuning for the neural network is also defined, in terms of choice of various functions (e.g., cost function, activation function, optimizer, etc.), training epochs, and learning rate, etc. The trained neural network can be applied for read offset estimation. Although a neural network is shown as an example of a machine learning clearance controller, other machine learning structures could be used instead of or in addition to a neural network, such as Bayesian networks, support vector machines, etc.

Figure 11:
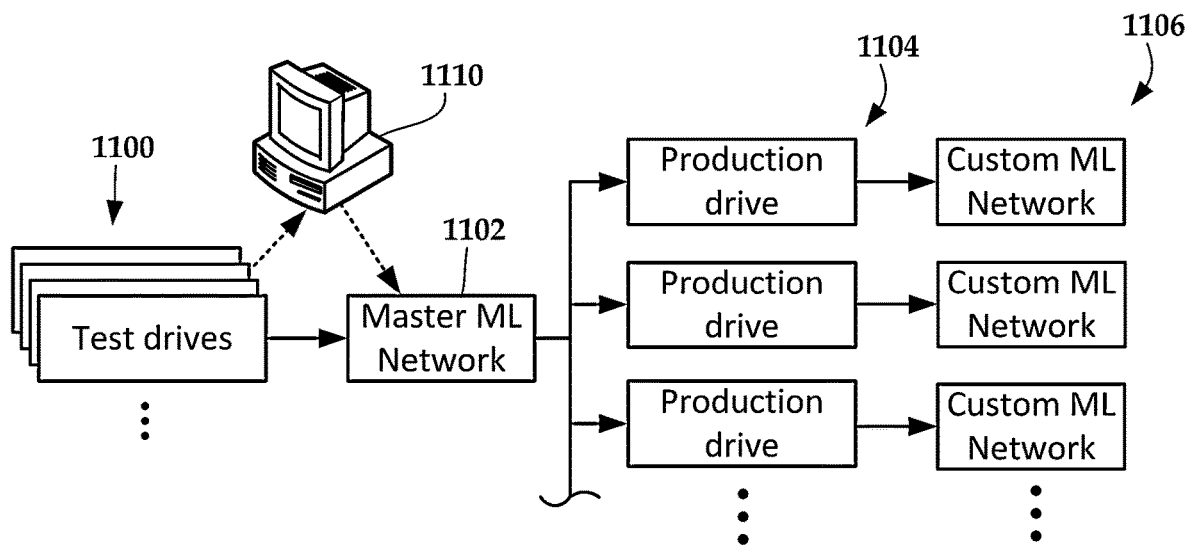
FIG. 11 is block diagram showing training of a machine-learning clearance controller according to an example embodiment.

The training of such a network can be achieved in two phases, as shown by the example embodiment of FIG. 11. A master ML network 1102 could be trained off-line for an HDD product line. Note that the use of the term "network" in FIG. 11 is not intended to limit the example to neural networks, as a similar process may be used for other machine learning models. The ML network 1102 can be trained, for example, over hundreds/thousands of test drives 1100 under different environment conditions and test track configurations. An offline machine, e.g., high-powered computer 1110 using specialized machine learning hardware (e.g., tensor processing units, graphical processing units) can perform the training using the data gathered from all of the drives 1100, e.g., into a single database.

For each fieldable production drive 1104, a fine-tuned, per-drive ML network 1106 is prepared, whose initial parameters include the master ML network 1102. Fine tuning involves additional training using data collected from just the production drive 1104. Note that since the ML network 1102 is presumable already close to a desired state for any of the production drives 1104, this additional training should be much less processor intensive. This additional training could be performed during manufacturing, and/or in the field, and can be customized for each head in the drives 1104. For example, an external high-power computer (e.g., computer 1110) could be used to perform the additional training in production, which could significantly reduce processing time in the factory compared to using the drive's internal processor for training. The fielded drive 1104 may be able to perform any additional training on its own, which could be done during idle time of the drive 1104, for example.

Figure 12:
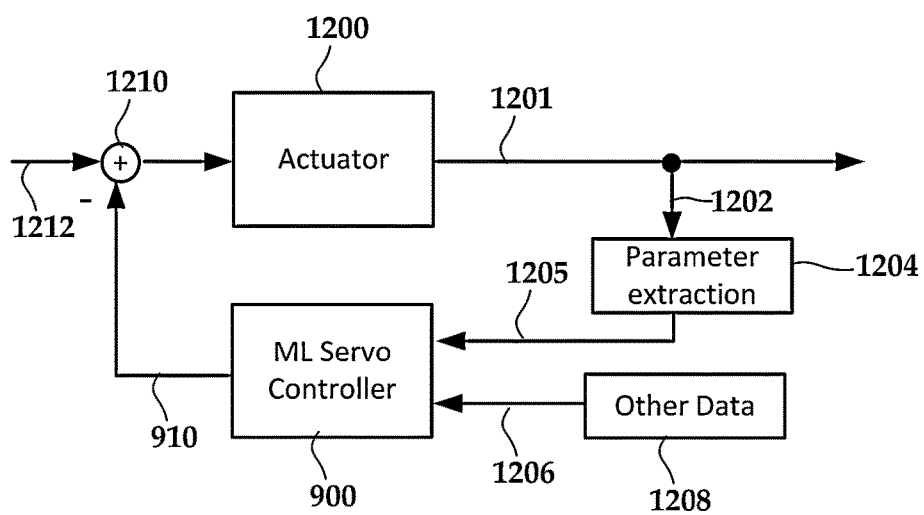
FIG. 12 is a block diagram showing a machine learning servo control loop according to an example embodiment.

The machine-learning apparatus (e.g., controller 900 in FIG. 9) that determines read offset can be used a disk drive servo controller loop. An example of such a controller loop is shown in the block diagram of FIG. 12. An actuator 1200 affects the radial position 1202 of a read head. The position of the read head may be affected by both a VCM and a microactuator located close to the head, although the fine tracking described in this example may be mostly controlled via a microactuator. The position of the read head over user data (or other non-servo data) affects an output signal 1202 produced by the reader. The output signal 1202 is processed by a parameter extraction component 1204, that produces parameters 1205 that are input to the ML controller 900, which is here labeled as a servo controller. The parameters 1205 can include any of those shown in FIG. 9, as well as averaged, filtered, or otherwise processed streams of those parameters. Another data source 1208 provides data 1206 not obtained from the reader, such as the head label, outputs from a vibration sensor, etc. Generally, the data 1205, 1206 is selected to collectively provide indications of both magnitude and direction, although some of individual data sources may provide only one of these.

The ML controller 900 produces an output 910 indicative of read offset, which can be combined with a position input 1212 at block 1210. For track following, the position input 1212 would be zero. Note that an output of the block 1210 is shown being directly input to the actuator 1200, although other controller components (e.g., filters) could be used to tailor the system response.

Figure 13:
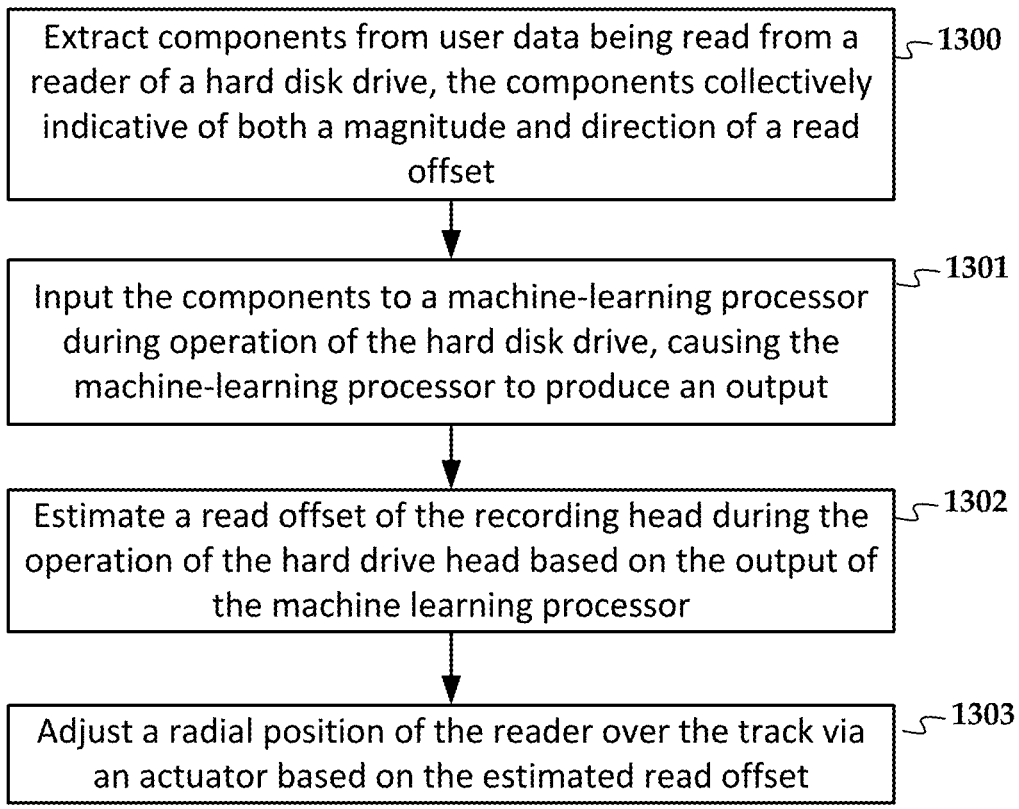
FIGS. 13 and 14 are flowcharts of methods according to example embodiments.

In FIG. 13, a flowchart illustrates a method according to an example embodiment. The method involves extracting 1300 components from user data being read from a reader of a hard disk drive. The components are collectively indicative of both a magnitude and direction of a read offset of the reader over a track, e.g., Volterra coefficients, MISO filter values, MISO weights, etc. Note that some components may provide an indication of only one of magnitude and direction, but the collective combination of outputs of the selected components will indicate both magnitude and direction. The components are input 1301 to a machine-learning processor during operation of the hard disk drive, causing the machine-learning processor to produce an output. A read offset of the recording head is estimated 1302 during the operation of the hard drive head based on the output of the machine learning processor. While reading the user data, a radial position of the reader over the track via is adjusted 1302 via an actuator based on the estimated read offset.

Figure 14:
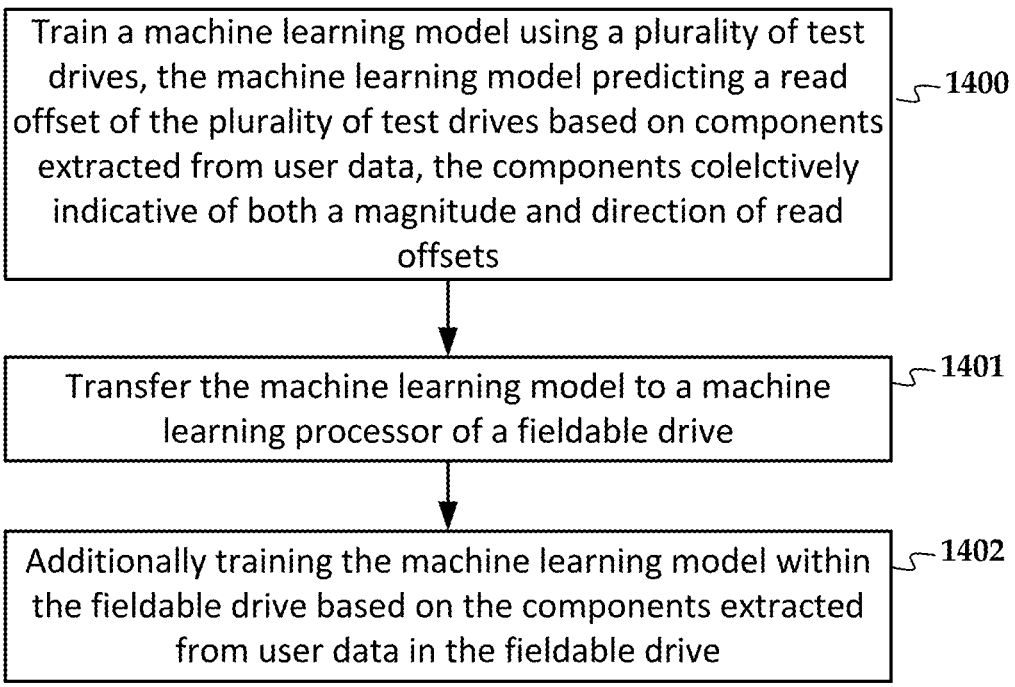

In FIG. 14, a flowchart illustrates a method according to another example embodiment. The method involves training 1400 a machine learning model using a plurality of test drives. The machine learning model predicts a read offset of the plurality of test drives based on components extracted from user data being read from readers of the plurality of hard disk drives. The components are collectively indicative of both a magnitude and direction of read offsets of each reader over a track. The machine learning model is transferred 1401 to a machine learning processor of a fieldable drive. The machine learning model is additionally trained 1402 within the fieldable drive based on the components extracted from other user data in the fieldable drive, thus the machine learning model in each drive will be custom-tuned to that drive's characteristics.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   extracting components from user data being read from a reader of a hard disk drive, the user data comprising non-servo data written between servo marks, the components collectively indicative of both a magnitude and direction of a read offset of the reader over a track;
   inputting the components to a machine-learning processor during operation of the hard disk drive, causing the machine-learning processor to produce an output;
   estimating a read offset of the reader during the operation of the hard drive head based on the output of the machine learning processor; and
   while reading the user data, adjusting a radial position of the reader over the track via an actuator based on the estimated read offset.

2. The method of claim 1, wherein the components comprise Volterra coefficients of the user data.

3. The method of claim 1, wherein the reader comprises two or more readers that read the user data together from a single head, wherein the components comprise weightings of the two or more readers used for multiple-input, single output detection.

4. The method of claim 1, wherein the reader comprises two or more readers that read the user data together from a single head, wherein the components comprise filter data extracted from taps of two or more multiple-input, single-output filters of the two or more readers.

5. The method of claim 1, further comprising inputting a signal quality metric of the user data to the machine learning processor, machine learning processor producing the output based on joint processing of the signal quality metric and the components.

6. The method of claim 1, further comprising inputting, to the machine learning processor, an indicator of radial position of the recording head over a disk surface, the machine learning processor producing the output based on joint processing of the indicator of radial position and the components.

7. The method of claim 1, wherein the machine learning processor comprises a feedforward neural network.

8. A hard disk drive comprising a controller coupled to the recording head, the controller operable to perform the method of claim 1.

9. The method of claim 1, wherein the components comprise coefficients of a summation of functions that represent a readback signal of the user data.

10. The method of claim 9, wherein the functions each represent an $n^{th}$-order impulse response of the system.

11. The method of claim 1, wherein the components comprise components of a domain transform of the user data.

12. A method, comprising:
    determining Volterra coefficients from data being read from a reader of a hard disk drive;
    inputting the Volterra coefficients to a machine-learning processor during operation of the hard disk drive, causing the machine-learning processor to produce an output; and
    estimating a read offset of the reader during the operation of the hard drive head based on the output of the machine learning processor.

13. The method of claim 12, further comprising adjusting a radial position of the reader via an actuator based on the estimated read offset.

14. The method of claim 12, further comprising inputting a signal quality metric of the data to the machine learning processor, machine learning processor producing the output based on joint processing of the signal quality metric and the Volterra coefficients.

15. The method of claim 12, further comprising inputting, to the machine learning processor, an indicator of radial position of the recording head over a disk surface, the machine learning processor producing the output based on joint processing of the indicator of radial position and the Volterra coefficients.

16. The method of claim 12, wherein the reader comprises two or more readers that read the data together from a single head, the method further comprising inputting, to the machine learning processor, weightings of the two or more readers used for multiple-input, single output detection, the machine learning processor producing the output based on joint processing of the weightings and the Volterra coefficients.

17. The method of claim 12, wherein the reader comprises two or more readers that read the data together, the method further comprising inputting, to the machine learning processor, filter data extracted from taps of two or more multiple-input, single-output filters of the two or more readers, the machine learning processor producing the output based on joint processing of the filter data and the Volterra coefficients.

18. The method of claim 12, wherein the machine learning processor comprises a feedforward neural network.

19. A hard disk drive comprising a controller coupled to the recording head, the controller operable to perform the method of claim 12.

* * * * *